United States Patent
Zhang et al.

(10) Patent No.: US 11,916,468 B2
(45) Date of Patent: Feb. 27, 2024

(54) PARALLELED DC-DC CONVERTERS WITH CIRCULATING CURRENT SUPPRESSION CIRCUIT

(71) Applicant: General Electric Company, Schenectady, NY (US)

(72) Inventors: Zheyu Zhang, Clifton Park, NY (US); Kenneth McClellan Rush, Ballston Spa, NY (US); Luca Tonini, Glenville, NY (US); Hao Tu, Raleigh, NC (US)

(73) Assignee: General Electric Company, Schenectady, NY (US)

(*) Notice: Subject to any disclaimer, the term of this patent is extended or adjusted under 35 U.S.C. 154(b) by 247 days.

(21) Appl. No.: 17/621,073

(22) PCT Filed: Aug. 13, 2019

(86) PCT No.: PCT/US2019/046353
§ 371 (c)(1),
(2) Date: Dec. 20, 2021

(87) PCT Pub. No.: WO2020/263290
PCT Pub. Date: Dec. 30, 2020

(65) Prior Publication Data
US 2022/0352806 A1    Nov. 3, 2022

Related U.S. Application Data

(60) Provisional application No. 62/865,786, filed on Jun. 24, 2019.

(51) Int. Cl.
*H02M 1/08* (2006.01)
*H02M 1/00* (2006.01)
(Continued)

(52) U.S. Cl.
CPC ......... *H02M 1/0038* (2021.05); *H02M 1/088* (2013.01); *H02M 3/01* (2021.05)

(58) Field of Classification Search
CPC ...... H02M 1/0038; H02M 3/01; H02M 1/088; H02M 1/0003; H02M 1/08
See application file for complete search history.

(56) References Cited

U.S. PATENT DOCUMENTS

| 7,742,318 B2 | 6/2010 | Fu et al. |
| 9,722,502 B2 | 8/2017 | Steimer |

(Continued)

OTHER PUBLICATIONS

International Search Report and Written Opinion, PCT/US2019/046353, dated Mar. 2, 2020, 16 pages.

(Continued)

*Primary Examiner* — Adolf D Berhane
(74) *Attorney, Agent, or Firm* — Armstrong Teasdale LLP

(57) ABSTRACT

A converter includes a DC bus, a first DC-DC converter, a second DC-DC converter, and a plurality of circulating current suppression circuits. The first DC-DC converter is coupled to the DC bus and includes a first plurality of switches. The second DC-DC converter is coupled to the DC bus in parallel with the first DC-DC converter. The second DC-DC converter includes a second plurality of switches. The plurality of circulating current suppression circuits are coupled to the DC bus and are further respectively coupled to the first DC-DC converter and the second DC-DC converter. Each of the plurality of circulating current suppression circuits has a resonant frequency at or around a switching frequency for the first and second pluralities of switches. The plurality of circulating current suppression circuits is configured to suppress current at or around the switching frequency and pass at least direct current.

20 Claims, 4 Drawing Sheets

(51) Int. Cl.
*H02M 3/00* (2006.01)
*H02M 1/088* (2006.01)

(56) References Cited

U.S. PATENT DOCUMENTS

| | | | |
|---|---|---|---|
| 10,727,761 B2* | 7/2020 | Morito | H02M 1/36 |
| 10,978,948 B2* | 4/2021 | Du | H02M 7/487 |
| 2016/0329811 A1 | 11/2016 | Du et al. | |

OTHER PUBLICATIONS

Neacsu Dorin O et al: "A review and ultimate solution for output filters for high-power low-voltage DC/DC converters", 2017 International Symposium on Signals, Circuits and Systems (ISSCS), IEEE, Jul. 13, 2017 (Jul. 13, 2017), pp. 1-4, XP033151778, DOI: 10.1109/iscs.2017.8034882.

Gohil Ghanshyamsinh et al: "Design of trap filter for the high power converters with parallel interleaved VSCs", IECON 2014—40th Annual Conference of the IEEE Industrial Electronics Society, IEEE, Oct. 29, 2014 (Oct. 29, 2014), pp. 2030-2036, XP032739293, DOI: 10.1109/IECON.2014.7048781.

Ye et al., "Circulating Current Minimization in High-Frequency AC Power Distribution Architecture With Multiple Inverter Modules Operated in Parallel", IEEE Transactions on Industrial Electronics, vol. 54, Issue: 5, pp. 26730-2687, Oct. 2007.

Gu et al., "Hybrid-Switching Full-Bridge DC-DC Converter With Minimal Voltage Stress of Bridge Rectifier, Reduced Circulating Losses, and Filter Requirement for Electric Vehicle Battery Chargers", IEEE Transactions on Power Electronics, vol. 28, Issue: 3, pp. 1132-1144, Mar. 2013.

Mai et al., "Circulating Current Reduction Strategy for Parallel-Connected Inverters Based IPT Systems", Energies, vol. 10, Issue: 3, pp. 1-17, 2017.

* cited by examiner

PARALLELED DC-DC CONVERTERS WITH CIRCULATING CURRENT SUPPRESSION CIRCUIT

CROSS REFERENCE TO RELATED APPLICATION

This application claims priority to U.S. Provisional Patent Application No. 62/865,786 filed on Jun. 24, 2019, naming Zheyu Zhang et al. as inventors, and titled "Paralleled DC-DC Converters with Circulating Current Suppression Circuit," the entire contents of which are hereby incorporated by reference herein.

BACKGROUND

The field of the disclosure relates generally to paralleled direct current (DC) to DC converters and, more particularly, to circulating current suppression circuit for use in a DC-DC converter.

Most known converter circuits, such as those in DC-DC converters, include multiple DC-DC converters coupled in parallel between a first bus and a second bus, or between an input bus and an output bus. The DC-DC converters generally include various switches, or switching circuits, controlled in a manner to produce a conversion from one DC level to another DC level. In the alternative, at least some other paralleled converter circuits may similarly control switching to produce an AC to DC or a DC to AC conversion. The inclusion of multiple converters in parallel within a larger converter generally increases the overall power capacity of, for example, the larger converter or other device within which the converter is implemented.

When multiple converters are paralleled between a first bus and a second bus, circulating currents develop over the low-impedance connection between a given pair of paralleled converters as a result of asynchronous control of their respective switching circuits and the voltage ripple that often exists within the converters themselves at their respective input or output terminals. It would be desirable to reduce the circulating currents between paralleled converters, such as a paralleled DC-DC converter.

BRIEF DESCRIPTION

In one aspect, a circuit for paralleled converters is provided. Each of the paralleled converters has a plurality of switches. The circuit includes a direct current (DC) bus having a positive bus and a negative bus. The positive bus and negative bus are each configured to be coupled to the paralleled converters. The circuit includes a plurality of inductor-capacitor (LC) series circuits coupled across the positive bus and the negative bus at each of the paralleled converters. Each of the plurality of LC series circuits has a resonant frequency at or around a switching frequency for the plurality of switches of the associated paralleled converter. Each of the plurality of LC series circuits is configured to shunt current at or around the switching frequency and function as an open circuit for at least direct current.

In another aspect, another circuit for paralleled converters is provided. Each of the paralleled converters has a plurality of switches. The circuit includes a DC bus having a positive bus and a negative bus. The positive bus and negative bus are each configured to be coupled to the paralleled converters. The circuit includes a plurality of LC parallel circuits coupled in series with the positive bus or the negative bus at each of the paralleled converters. Each of the plurality of LC parallel circuits has a resonant frequency at or around a switching frequency for the plurality of switches of the associated paralleled converter. Each of the plurality of LC parallel circuits is configured to block current at or around the switching frequency and pass at least direct current.

In yet another aspect, a converter is provided. The converter includes a DC bus, a first DC-DC converter, a second DC-DC converter, and a plurality of circulating current suppression circuits. The first DC-DC converter is coupled to the DC bus and includes a first plurality of switches. The second DC-DC converter is coupled to the DC bus in parallel with the first DC-DC converter. The second DC-DC converter includes a second plurality of switches. The plurality of circulating current suppression circuits are coupled to the DC bus and are further respectively coupled to the first DC-DC converter and the second DC-DC converter. Each of the plurality of circulating current suppression circuits has a resonant frequency at or around a switching frequency for the first and second pluralities of switches. The plurality of circulating current suppression circuits is configured to suppress current at or around the switching frequency and pass at least direct current.

DRAWINGS

These and other features, aspects, and advantages of the present disclosure will become better understood when the following detailed description is read with reference to the accompanying drawings in which like characters represent like parts throughout the drawings, wherein.

Figure 1:
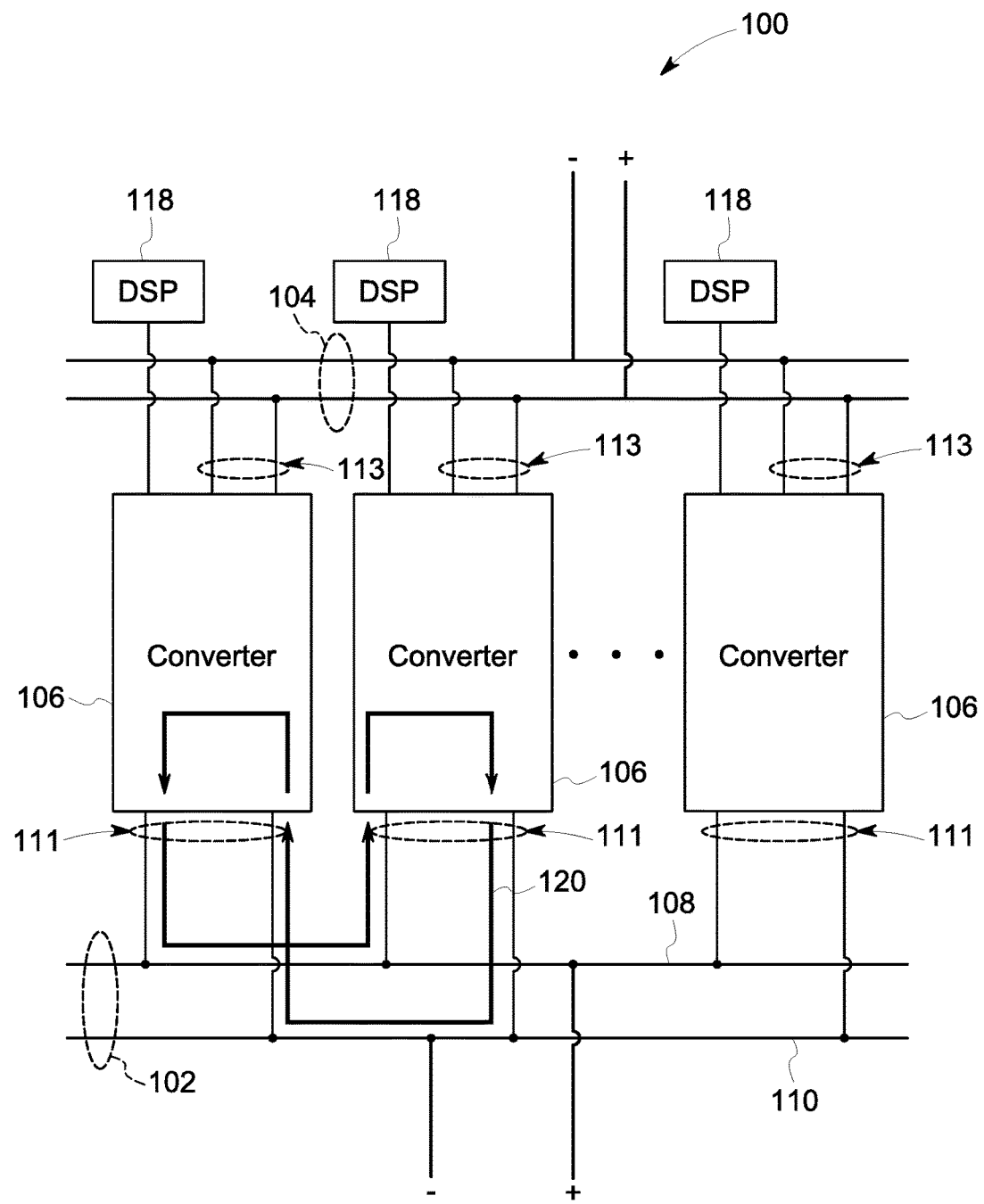
FIG. 1 is a schematic diagram of an exemplary paralleled DC-DC converters.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it relates. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein. Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the present disclosure relate to a circulating current suppression circuit for paralleled converters, such as paralleled DC-DC converters. The circulating current suppression circuits described herein provide an inductor-capacitor (LC) circuit having a resonant frequency tuned to a switching frequency at which switching circuits within the paralleled converters are configured to operate. In certain embodiments, the LC circuit includes a series-coupled inductor and capacitor coupled across the positive and negative DC bus for each of the paralleled converters. In certain other embodiments, the LC circuit includes a parallel-coupled inductor and capacitor coupled in series with, for example, the positive bus of each of the paralleled converters. In alternative embodiments, the parallel-coupled inductor and capacitor may be coupled in series with the negative bus of each of the paralleled converters. The circulating current suppression circuits described herein may be incorporated into either the input side or the output side of the paralleled converters, or both, to reduce circulating currents that develop as a result of voltage ripple within the individual converters and asynchronous switching among the paralleled converters. The circulating current suppression circuits described herein suppress certain frequencies of circulating current that are among the most prominent sources of circulating currents, and without introducing large impedances into the forward path of the paralleled converter.

FIG. 1 is a schematic diagram of exemplary DC-DC converter 100. DC-DC converter 100 includes a first bus 102 and a second bus 104. DC-DC converter 100 includes a plurality of paralleled converters 106 respectively coupled in parallel between first bus 102 and second bus 104. A first current, or input current, is supplied on first bus 102 to paralleled converters 106 via input terminals 111. A second current, or output current, is received, from paralleled converters 106, via output terminals 113, on second bus 104, or vice versa.

First bus 102 includes a DC bus having a positive bus 108 and a negative bus 110. First bus 102 respectively couples to paralleled converters 106 at input terminals 111. DC-DC converter 100 may step-up or step-down DC voltages for supplying, for example, DC power from a renewable source, such as a photovoltaic array, to an energy storage device, such as a battery. In certain embodiments, DC-DC converter 100 includes an energy storage capacitor (not shown) coupled across first bus 102, e.g., across positive bus 108 and negative bus 110 at each paralleled converter 106. The capacitive value of the energy storage capacitor varies per application to provide sufficient power capacity for the given application. For example, in one embodiment, the energy storage capacitor includes one or more capacitors having a combined capacitance in a range of 100 microfarad to 100 millifarad. Generally, higher-power applications utilize greater energy storage capacitances. The energy storage capacitor should have an operating frequency range, or "rated" frequency, around the switching frequencies of paralleled converters 106. For example, paralleled converters 106 may utilize a switching frequency in the range of 1 KiloHertz (KHz) to 1 megahertz (MHz), and so the energy storage capacitor should be rated to operate at least in that frequency range of 1 KHz to 1 MHz.

In certain embodiments, DC-DC converter 100 includes one or more digital signal processor (DSP) 118 or other suitable processing device for controlling the semiconductor switches within each of paralleled converters 106 and to enable control of total current conducted through DC-DC converter 100 and, more specifically, paralleled converters 106. For example, in certain embodiments, each of paralleled converters 106 includes a dedicated DSP 118 to control its semiconductor switches.

Each paralleled converter 106 includes a converter circuit (not shown) having one or more switching devices, or switching circuits, such as semiconductor switches, configured to conduct a share of a total current supplied in the second current. Generally, each converter's switching devices are independently controlled and are not exactly aligned. In other words, control of the switching devices is asynchronous. Asynchronous control of the switching circuits in each of paralleled converters 106 and voltage ripple within paralleled converters 106 resulting from switching noise introduced by the switching circuits can introduce circulating currents 120 between a given pair of paralleled converters 106. Consequently, these circulating currents 120 are predominately in a frequency band around the switching frequency at which the switching circuits are operating within each of paralleled converters 106. Conventionally, circulating currents 120 are suppressed by introducing a large inductance at the terminals of each paralleled converter. However, the inductors themselves are large and costly.

Figure 2:
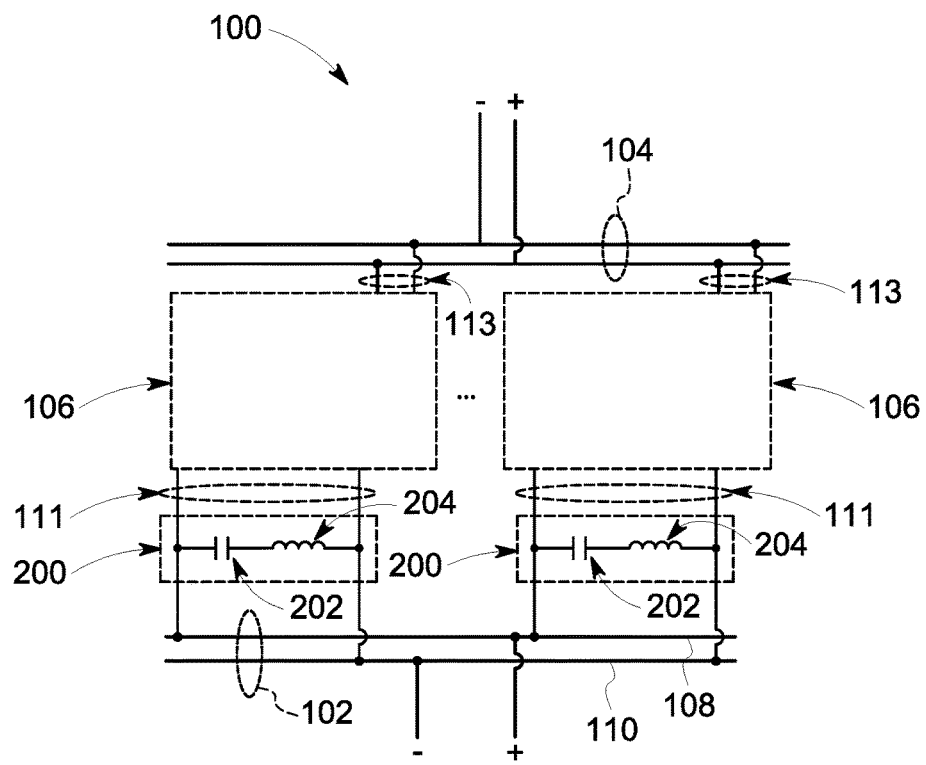
FIG. 2 is a schematic diagram of paralleled DC-DC converters with an exemplary circulating current suppression circuit.

FIG. 2 is a schematic diagram of DC-DC converter 100 with an exemplary circulating current suppression circuit 200. Each paralleled converter 106 includes circulating current suppression circuit 200 coupled across first bus 102 at input terminals 111 for paralleled converter 106. In certain embodiments, DC-DC converter 100 includes circulating suppression circuit 200 coupled across second bus 104 at output terminals 113 for paralleled converters 106. DC-DC converter 100, in certain embodiments, may include circulating current suppression circuit 200 both coupled between paralleled converters 106 and first bus 102, and between paralleled converters 106 and second bus 104. Circulating current suppression circuit 200 is an LC series circuit having a capacitance 202 and an inductance 204. Capacitance 202 and inductance 204 are selected such that their combination gives circulating current suppression circuit 200 a resonant frequency at or around the switching frequency of the switching devices within each paralleled converter 106, which may be, for example in the range of 1 KHz to 100 KHz. Generally, the resonant frequency, f, is represented by the equation $f=1/2\pi\sqrt{LC}$, where L is the value of inductance 204 in Henrys and C is the value of capacitance 202 in Farads. Accordingly, circulating currents that develop at and around that switching frequency, f, are shunted through the LC series circuit of circulating current suppression circuit 200, which functions as a very low impedance at that frequency.

Generally, circulating current suppression circuit 200 suppresses a band of frequencies of current around the resonant frequency, f. Given the values of L and C for inductance 204 and capacitance 202, respectively, the precise level of current suppression depends on how near the resonant frequency, f, is to the frequency at which such current is produced. Current having a frequency of f experiences the greatest suppression. As the frequency of current tends away from f, the current suppression is reduced. Generally, the switching frequency for paralleled converters 106 is digitally controlled and known with good precision. However, inductance 204 and capacitance 202 in a particular embodiment are typically manufactured to within a certain degree of tolerance for L and C, respectively. Consequently, the resonant frequency, f, for circulating current suppression circuit 200 may vary slightly from the switching frequency of paralleled converters 106 for which it is designed. However, although the greatest current suppression is at the resonant frequency, f, circulating current suppression circuit 200 is still effective at suppressing currents around the switching frequency for paralleled converters 106. Moreover, in certain embodiments, the resonant frequency, f, may be selected such that it is within plus-or-minus 10% of the switching frequency to achieve effective current suppression of circulating currents around the switching frequency. In other words, the resonant frequency, f, should be at or around the switching frequency, and need not be precisely the switching frequency of paralleled converters 106.

Figure 3:
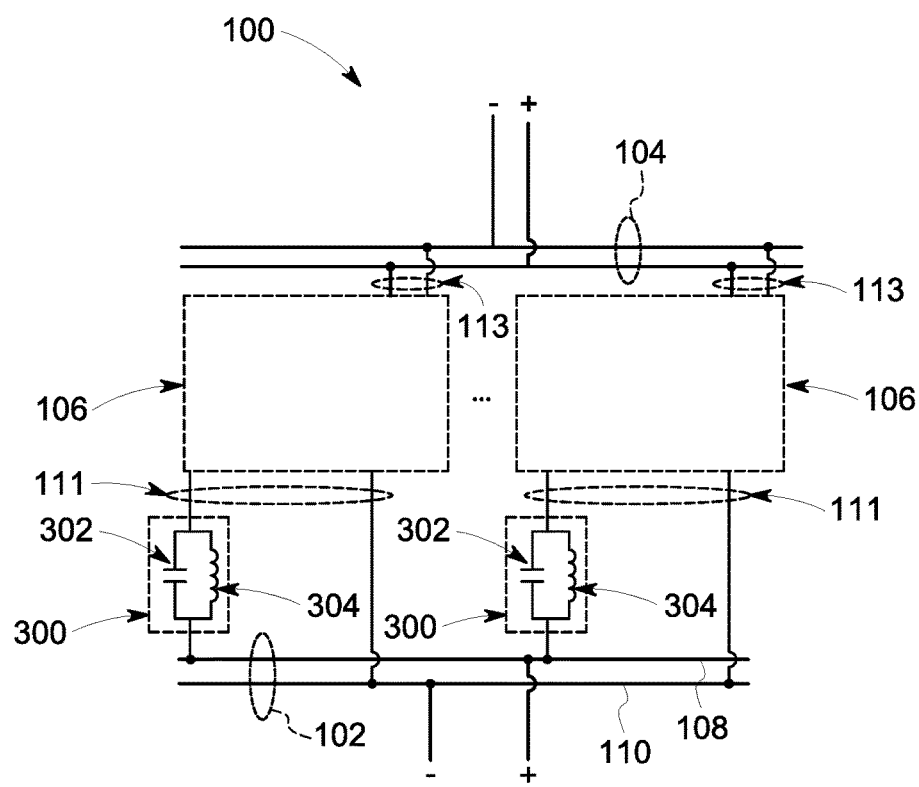
FIG. 3 is a schematic diagram of paralleled DC-DC converters with another exemplary circulating current suppression circuit.

FIG. 3 is a schematic diagram of DC-DC converter 100 with another exemplary circulating current suppression circuit 300. Each paralleled converter 106 includes circulating current suppression circuit 300 coupled in series with one of input terminals 111 for paralleled converter 106. For example, in certain embodiments, circulating current suppression circuit 300 is coupled in series with a positive input terminal and positive bus 108. In certain embodiments, DC-DC converter 100 includes circulating suppression circuit 300 coupled in series with one of output terminals 113 for paralleled converters 106. DC-DC converter 100, in certain embodiments, may include circulating current suppression circuit 300 both coupled between paralleled converters 106 and first bus 102, and between paralleled converters 106 and second bus 104. Circulating current suppression circuit 300 is an LC parallel circuit having a capacitance 302 and an inductance 304. Capacitance 302 and inductance 304 are selected such that their combination gives circulating current suppression circuit a resonant frequency at or around the switching frequency of the switching devices within each paralleled converter 106, which may be, for example, in the range of 1 KHz to 100 KHz. Generally, the resonant frequency, f, is represented by the equation $f=1/2\pi\sqrt{L/C}$, where L is the value of inductance 304 in Henrys and C is the value of capacitance 302 in Farads. Accordingly, circulating currents that develop at and around that frequency, f, are blocked by the parallel LC circuit of circulating current suppression circuit 200, which functions as a high impedance at that frequency.

Generally, circulating current suppression circuit 300 suppresses a band of frequencies of current around the resonant frequency, f. Given the values of L and C for inductance 304 and capacitance 302, respectively, the precise level of current suppression depends on how near the resonant frequency, f, is to the frequency at which such current is produced. Current having a frequency of f experiences the greatest suppression. As the frequency of current tends away from f, the current suppression is reduced. Generally, the switching frequency for paralleled converters 106 is digitally controlled and known with good precision. However, inductance 304 and capacitance 302 in a particular embodiment are typically manufactured to within a certain degree of tolerance for L and C, respectively. Consequently, the resonant frequency, f, for circulating current suppression circuit 300 may vary slightly from the switching frequency of paralleled converters 106 for which it is designed. However, although the greatest current suppression is at the resonant frequency, f, circulating current suppression circuit 300 is still effective at suppressing currents around the switching frequency for paralleled converters 106. Moreover, in certain embodiments, the resonant frequency, f, may be selected such that it is within plus-or-minus 10% of the switching frequency to achieve effective current suppression of circulating currents around the switching frequency. In other words, the resonant frequency, f, should be at or around the switching frequency, and need not be precisely the switching frequency of paralleled converters 106.

Figure 4:
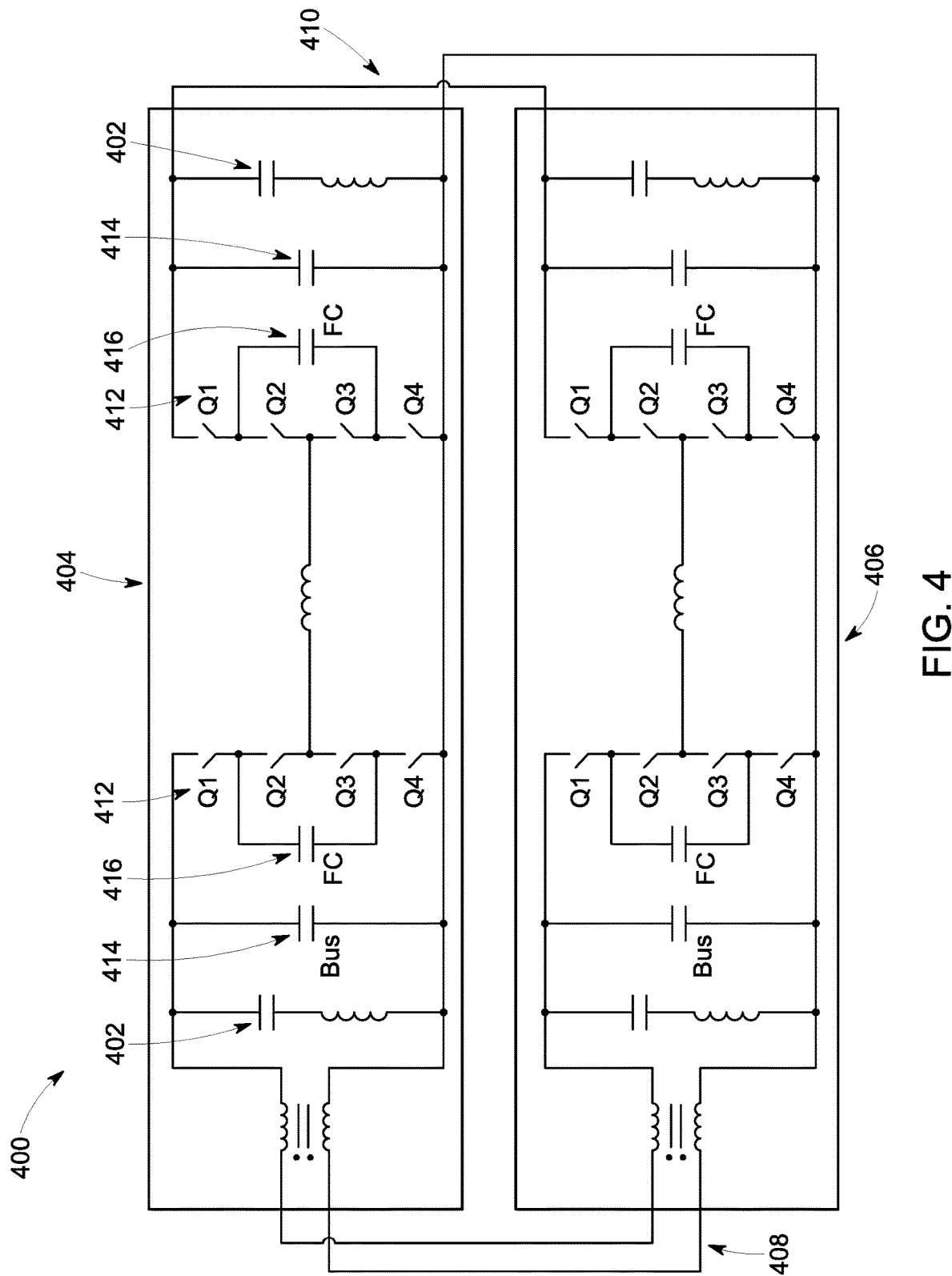
FIG. 4 is a schematic diagram of paralleled flying-capacitor DC-DC converters with one embodiment of a circulating current suppression circuit.

FIG. 4 is a schematic diagram of paralleled flying-capacitor DC-DC converters 400 with one embodiment of a circulating current suppression circuit 402. Paralleled flying-capacitor DC-DC converters 400 include at least two converters 404 and 406 coupled between a first bus 408 and a second bus 410. Each of converters 404 and 406 includes a plurality of switching devices 412 configured to be controlled to switch to affect the DC-DC conversion from first bus 408 to second bus 410. Each of converters 404 and 406 also includes bus capacitors 414 and flying capacitors 416.

Circulating current suppression circuit 402 is a series-coupled LC circuit coupled across first bus 408 at the input of each of converters 404 and 406, and a series-coupled LC circuit coupled across second bus 410 at the output of each of converters 404 and 406. As described above with respect to the embodiment shown in FIG. 2, the capacitance value and inductance value used in the LC circuit are selected such that the resonant frequency is at or around the switching frequency at which switching devices 412 are operated. The switching devices 412 are semiconductor switches that may be embodied in one or more power MOSFET, IGBT, or BJT, for example. The resulting LC circuit functions as a shunt for circulating currents at and around the resonant frequency.

Figure 5:
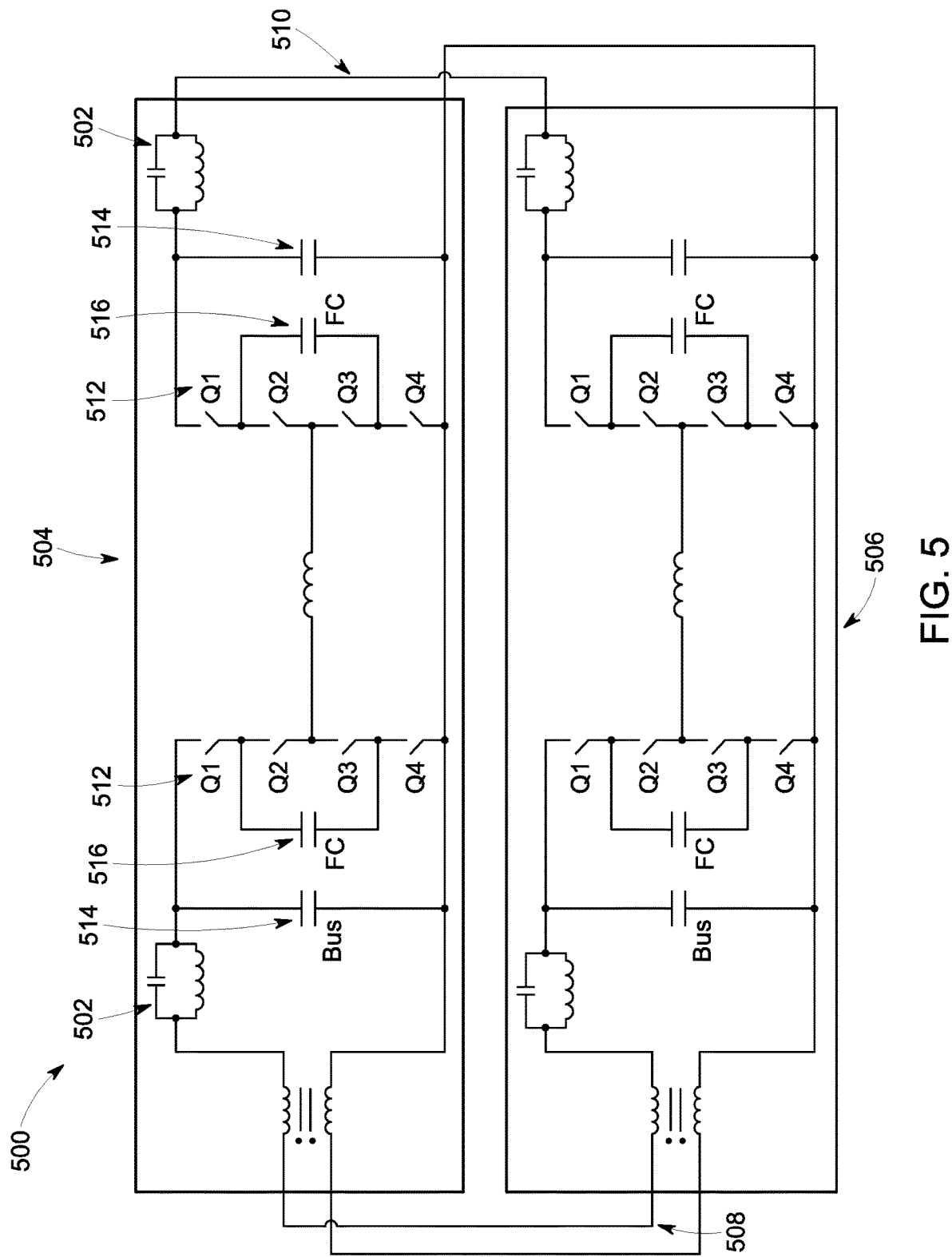
FIG. 5 is a schematic diagram of paralleled flying-capacitor DC-DC converters with another embodiment of a circulating current suppression circuit.

FIG. 5 is a schematic diagram of paralleled flying-capacitor DC-DC converters 500 with another embodiment of a circulating current suppression circuit 502. Paralleled flying-capacitor DC-DC converters 500 include at least two converters 504 and 506 coupled between a first bus 508 and a second bus 510. Each of converters 504 and 506 includes a plurality of switching devices 512 configured to be controlled to switch to affect the DC-DC conversion from first bus 508 to second bus 510. Each of converters 504 and 506 also includes bus capacitors 514 and flying capacitors 516.

Circulating current suppression circuit 502 is a parallel-coupled LC circuit coupled in series with first bus 508 at the input of each of converters 504 and 506, and a parallel-coupled LC circuit coupled in series with second bus 510 at the output of each of converters 504 and 506. As described above with respect to the embodiment shown in FIG. 3, the capacitance value and inductance value used in the LC circuit are selected such that the resonant frequency is at or around the switching frequency at which switching devices 512 are operated. The switching devices 512 are semiconductor switches that may be embodied in one or more power MOSFET, IGBT, or BJT, for example. The resulting LC circuit functions as an open circuit for circulating currents at and around the resonant frequency.

The above described embodiments of a circulating current suppression circuit for paralleled converters, such as a DC-DC converter, provide an inductor-capacitor (LC) circuit tuned to a switching frequency at which switching circuits within the paralleled converters are configured to operate. In certain embodiments, the LC circuit includes a series-coupled inductor and capacitor coupled across the positive and negative bus for each of the paralleled converters. In certain other embodiments, the LC circuit includes a parallel-coupled inductor and capacitor coupled in series with, for example, the positive bus of each of the paralleled converters. In alternative embodiments, the parallel-coupled inductor and capacitor may be coupled in series with the negative bus of each of the paralleled converters. The circulating current suppression circuits described herein may be incorporated into either the input side or the output side of the paralleled converter, or both, to reduce circulating currents that develop as a result of voltage ripple between the individual paralleled converters and asynchronous switching among the paralleled converters. The circulating current suppression circuits described herein suppress certain frequencies of circulating current that are among the most prominent sources of circulating currents, and without introducing large impedances into the forward path of the paralleled converter.

An exemplary technical effect of the methods, systems, and apparatus described herein includes at least one of: (a) tuning an inductor-capacitor circuit to a switching frequency utilized in a DC-DC converter; (b) reducing circulating current among paralleled converters originating from switching frequency noise; and (c) reducing noise introduced to external circuits on both the source-side and load-side of the switching circuit due to reduced circulating currents.

Exemplary embodiments of methods, systems, and apparatus for switching circuits are not limited to the specific embodiments described herein, but rather, components of systems and/or steps of the methods may be utilized independently and separately from other components and/or steps described herein. For example, the methods may also be used in combination with other non-conventional switching circuits, and are not limited to practice with only the systems and methods as described herein. Rather, the exemplary embodiment can be implemented and utilized in connection with many other applications, equipment, and systems that may benefit from reduced cost, reduced complexity, commercial availability, improved manufacturability, and reduced product time-to-market.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit for paralleled converters each having a respective plurality of switches, said circuit comprising:
   a direct current (DC) bus comprising a positive bus and a negative bus each configured to be coupled to the paralleled converters; and
   a plurality of inductor-capacitor (LC) series circuits coupled across said positive bus and said negative bus at each of the paralleled converters, each of said plurality of LC series circuits having a resonant frequency at or around a switching frequency for the plurality of switches of the associated paralleled converter, wherein each of said plurality of LC series circuits is configured to shunt current around the switching frequency and function as an open circuit for at least direct current.

2. The circuit of claim 1, wherein said DC bus is configured to be coupled to input terminals of the paralleled converters.

3. The circuit of claim 1, wherein said DC bus is configured to be coupled to output terminals of the paralleled converters.

4. The circuit of claim 1, wherein each of said plurality of LC series circuits comprises at least one inductor coupled in series with at least one capacitor.

5. The circuit of claim 1, wherein said plurality of LC series circuits have a resonant frequency in a range of about 1 kilohertz to about 1 megahertz.

6. The circuit of claim 1, wherein each of said plurality of LC series circuits has a resonant frequency within plus-or-minus 10% of the switching frequency for the plurality of switches of the associated paralleled converter.

7. A circuit for paralleled converters each having a plurality of switches, said circuit comprising:
- a direct current (DC) bus comprising a positive bus and a negative bus each configured to be coupled to the paralleled converters; and
- a plurality of inductor-capacitor (LC) parallel circuits coupled in series with said positive bus or said negative bus at each of the paralleled converters, each of said plurality of LC parallel circuits having a resonant frequency at or around a switching frequency for the plurality of switches of the associated paralleled converter, and wherein each of said plurality of LC parallel circuits is configured to block current around the switching frequency and pass at least direct current.

8. The circuit of claim 7, wherein said DC bus is configured to be coupled to input terminals of the paralleled converters.

9. The circuit of claim 7, wherein said DC bus is configured to be coupled to output terminals of the paralleled converters.

10. The circuit of claim 7, wherein each of said plurality of LC parallel circuits comprises at least one inductor coupled in parallel with at least one capacitor.

11. The circuit of claim 7, wherein said plurality of LC parallel circuits have a resonant frequency in a range of about 1 kilohertz to about 1 megahertz.

12. The circuit of claim 7, wherein each of said plurality of LC parallel circuits has a resonant frequency within plus-or-minus 10% of the switching frequency for the plurality of switches of the associated paralleled converter.

13. A converter, comprising:
- a direct current (DC) bus;
- a first DC-DC converter coupled to said DC bus and having a first plurality of switches;
- a second DC-DC converter coupled to said DC bus in parallel with said first DC-DC converter, said second DC-DC converter having a second plurality of switches; and
- a plurality of circulating current suppression circuits coupled to said DC bus and further respectively coupled to said first DC-DC converter and said second DC-DC converter, each of said plurality of circulating current suppression circuits having a resonant frequency at or around a switching frequency for said first and second pluralities of switches, and wherein said plurality of circulating current suppression circuits is configured to suppress current around the switching frequency and pass at least direct current.

14. The converter of claim 13, wherein said DC bus comprises an input bus for said first DC-DC converter and said second DC-DC converter.

15. The converter of claim 13, wherein said DC bus comprises an output bus for said first DC-DC converter and said second DC-DC converter.

16. The converter of claim 13, wherein said DC bus comprises a positive bus and a negative bus.

17. The converter of claim 16, wherein said plurality of circulating current suppression circuits comprises a plurality of inductor-capacitor (LC) series circuits coupled across said positive bus and said negative bus at said first DC-DC converter and at said second DC-DC converter, and wherein each of said plurality of LC series circuits is configured to shunt current at or around the switching frequency and function as an open circuit for at least direct current.

18. The converter of claim 16, wherein said plurality of circulating current suppression circuits comprises a plurality of inductor-capacitor (LC) parallel circuits coupled in series with said positive bus or said negative bus at said first DC-DC converter and at said second DC-DC converter, and wherein each of said plurality of LC parallel circuits is configured to block current at or around the switching frequency and pass at least direct current.

19. The converter of claim 13, wherein the switching frequency is in a range of about 1 kilohertz to about 1 megahertz.

20. The circuit of claim 13, wherein each of said plurality of circulating current suppression circuits has a resonant frequency within plus-or-minus 10% of the switching frequency for said first plurality of switches and said second plurality of switches.

* * * * *